US010405476B2

(12) United States Patent
Bell et al.

(10) Patent No.: US 10,405,476 B2
(45) Date of Patent: Sep. 10, 2019

(54) DOUBLE ROLLING BASKET ATTACHMENT

(71) Applicant: CNH Industrial America LLC, New Holland, PA (US)

(72) Inventors: Joshua Bell, Peoria, IL (US); Dean A. Knobloch, Tucson, AZ (US); Timothy R. Blunier, Danvers, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/414,939

(22) Filed: Jan. 25, 2017

(65) Prior Publication Data
US 2018/0206386 A1 Jul. 26, 2018

(51) Int. Cl.
*A01B 63/00* (2006.01)
*A01B 63/32* (2006.01)
*A01B 29/04* (2006.01)
*A01B 49/02* (2006.01)

(52) U.S. Cl.
CPC ............ *A01B 63/002* (2013.01); *A01B 29/04* (2013.01); *A01B 29/048* (2013.01); *A01B 63/32* (2013.01); *A01B 49/027* (2013.01)

(58) Field of Classification Search
CPC ....... A01B 63/002; A01B 63/32; A01B 29/04; A01B 49/027; A01B 29/048
See application file for complete search history.

(56) References Cited

U.S. PATENT DOCUMENTS

| 2,458,549 | A | * | 1/1949 | Bachman | B62D 55/1083 305/134 |
| 2,954,239 | A | * | 9/1960 | Kollander | B62D 7/144 280/426 |
| 3,892,278 | A | | 7/1975 | Smith et al. | |
| 3,938,605 | A | * | 2/1976 | Koch | B62D 55/10 180/9.5 |
| 3,998,275 | A | | 12/1976 | Eisenhardt | |
| 4,044,841 | A | | 8/1977 | Smith et al. | |
| 4,223,742 | A | | 9/1980 | Stark | |
| 4,249,613 | A | | 2/1981 | Scribner | |
| 4,280,564 | A | | 7/1981 | van der Lely | |
| 4,315,547 | A | * | 2/1982 | Rau | A01B 79/00 172/1 |

(Continued)

FOREIGN PATENT DOCUMENTS

FR 2 756 699 A1 6/1998
GB 2 198 323 A 6/1988

OTHER PUBLICATIONS

"Soil Conditioning As Good As It Gets", Rolling Harrow Soil Conditioner, Unverferth Manufacturing Company, 2013 (8 pages).
(Continued)

*Primary Examiner* — Jamie L McGowan
(74) *Attorney, Agent, or Firm* — Rebecca L. Henkel; Rickard K. DeMille

(57) ABSTRACT

An agricultural tillage implement includes a frame member and at least one double rolling basket assembly coupled to the frame member. The double rolling basket assembly has a forward basket and a rearward basket behind the forward basket. A horizontal beam is rotatably connected at the opposite ends thereof to the forward basket and the rearward basket. The horizontal beam has a pivotal connection to the frame member.

5 Claims, 3 Drawing Sheets

(56) References Cited

U.S. PATENT DOCUMENTS

| | | | |
|---|---|---|---|
| 4,446,925 A * | 5/1984 | Vachon | A01B 63/22 172/142 |
| 4,489,789 A * | 12/1984 | Pearce | A01B 51/04 172/443 |
| 4,537,262 A * | 8/1985 | van der Lely | A01B 49/027 172/140 |
| 4,561,504 A * | 12/1985 | Andersen | A01B 23/046 172/142 |
| 5,622,227 A | 4/1997 | McDonald | |
| 6,554,078 B1 | 4/2003 | McDonald | |
| 6,871,709 B2 | 3/2005 | Knobloch et al. | |
| 8,020,629 B1 | 9/2011 | McFarlane et al. | |
| 8,074,730 B2 | 12/2011 | Kovach et al. | |
| 2003/0159840 A1 | 8/2003 | Schmidt, Jr. | |
| 2007/0169950 A1 | 7/2007 | Grieshop | |
| 2008/0066935 A1 * | 3/2008 | Becker | A01B 63/32 172/13 |
| 2011/0030979 A1 | 2/2011 | Kovach et al. | |
| 2013/0199807 A1 | 8/2013 | Hoffman et al. | |
| 2014/0209335 A1 * | 7/2014 | Casper | A01B 5/04 172/260.5 |
| 2014/0251646 A1 * | 9/2014 | Gray | A01B 61/044 172/1 |
| 2015/0053437 A1 * | 2/2015 | Kovach | A01B 29/048 172/149 |
| 2015/0129260 A1 * | 5/2015 | Blunier | F16C 23/08 172/552 |
| 2015/0156946 A1 * | 6/2015 | Sudbrink | A01B 63/14 172/1 |

OTHER PUBLICATIONS

"Mounted Harrows—Single & Double Rolling Basket", McFarlane Manufacturing Co., Apr. 29, 2005 (1 page).

"Wil-Rich Parts Manual", Wil-Rich, Wahpeton, North Dakota, Jun. 30, 2006 (42 pages).

* cited by examiner

DOUBLE ROLLING BASKET ATTACHMENT

BACKGROUND OF THE INVENTION

1. Field of the Invention

The present invention relates to agricultural implements, and, more particularly, to agricultural tillage implements having rolling basket attachments.

2. Description of the Related Art

Farmers utilize a wide variety of tillage implements to prepare soil for planting. Tillage equipment prepares the soil by way of mechanical agitation of various types, such as digging, stirring, and overturning. Some examples include plowing (overturning with moldboards or chiseling with chisel shanks), rototilling, rolling with cultipackers or other rollers, harrowing, and cultivating with cultivator shanks. Tillage is often classified into two types, primary and secondary. There is no strict definition of the two tillage types; however, a loose distinction between the two types of tillage is that primary tillage is deeper and more thorough while secondary is shallower. Primary tillage, such as plowing, tends to produce a rough surface finish and significantly subsoil effects, whereas secondary tillage tends to produce a smoother surface finish, such as that required to make a good seedbed for many crops. Harrowing and rototilling often combine primary and secondary tillage into one operation.

Some tillage implements include two or more sections coupled together to perform multiple functions as the implements are pulled through fields by tractors. A field cultivator is capable simultaneously of tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting a crop. Grass or residual crop material disposed on top of the soil during harvesting is also worked into the seedbed so that the residual material does not interfere with a seeding implement subsequently passing through the seedbed.

A field cultivator as described above may also include an optional rear auxiliary implement for finishing the seedbed for seeding. For example, a rear auxiliary implement may include a spike tooth harrow, spring tooth harrow, rolling basket, etc., or any combination thereof. The rolling basket has a reel with a plurality of spaced blades, positioned either axial or helical from end-to-end, for breaking clods into smaller sizes and chopping up the debris still remaining on the top of the soil.

The rolling basket arrangement can be used to roll behind the rows of tines of a harrow, to flatten the ridges left by the tines and move the residual crop material into the soil to enhance contact with the soil. The rolling basket is used to provide a firm, level field with coarse soil on top that resists crusting, with the finer soil particles at planting depth for optimum seed-to-soil contact.

One of the primary uses for rolling baskets is to break down clod sizes and firm up seed beds for subsequent planting. However, in some field conditions, a single pass with a rolling basket is insufficient for optimum clod size reduction. Making multiple passes with an independent basket implement may provide better results, but such an operation is inefficient and expensive. Implements with double baskets have been rigid, making the baskets difficult to adjust for varying ground conditions. Rigid designs with double basket have not maintained desirable ground contact over uneven surfaces and rough conditions. Further, rigid baskets encountering a large rock or other obstacle can be damaged.

What is needed in the art is a multiple rolling basket attachment for tillage equipment wherein the baskets can move to follow uneven terrain while maintaining better ground contact for clod size reduction.

SUMMARY OF THE INVENTION

The present invention provides a tillage implement with a rolling basket assembly having fore and aft baskets connected one to another by hanger assemblies that enable the baskets to follow the field contour more closely, and to walk up and over large obstacles encountered, such as large clods and stones.

The double rolling basket attachment, in one form, is directed to an agricultural tillage implement, having a frame member; a secondary frame member coupled with the frame member, and a side hanger assembly coupled to the secondary frame. The side hanger assembly includes a horizontal beam having first and second ends and a pivotal connection between the first and second ends. A first rolling basket is connected to the first end of the horizontal beam, and a second rolling basket connected to the second end of the horizontal beam.

The double rolling basket attachment, in another form, is directed to an attachment for an agricultural tillage implement having a frame. The double rolling basket attachment is provided with a forward basket, a rearward basket directly behind the forward basket and a horizontal beam having a forward end forming a rotational coupling with the forward basket and a rearward end forming a rotational coupling with the rearward basket. A leg forms a fixed connection to the secondary frame. A pivotal connection is provided between the leg and the horizontal beam.

The double rolling basket attachment, in yet another form, is directed to an agricultural tillage implement having a frame member. A secondary frame member is movably coupled with the frame member. A double rolling basket assembly is coupled with the secondary frame member. The double rolling basket assembly includes a first rolling basket, a second rolling basket behind the first rolling basket and first and second hanger assemblies at opposite ends of the first and second rolling basket. Each of the hanger assemblies has a leg connected to the secondary frame member and a horizontal beam pivotally connected to the leg. Each horizontal beam has rotatable connections to the first basket and the second basket.

An advantage of the double rolling basket attachment disclosed herein is that rolling baskets are provided in a fore and aft arrangement that promotes more effective clod size reduction and surface preparation than is provided by a single rolling basket.

Another advantage of the double rolling basket attachment disclosed herein is that baskets arranged one in front of the other can follow the field terrain more closely, to engage clods more effectively and to encounter large clods, lumps, stones and other rough surface conditions to achieve a better prepared seedbed.

Still another advantage of the double rolling basket attachment disclosed herein is that the baskets will climb up and over clods, stones or other obstacles encountered.

Yet another advantage is that the double rolling basket attachment is suitable for use with existing implements as an added attachment thereto.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate some embodiments of the invention and such exemplifications are not to be construed as limiting the scope of the invention in any manner.

DETAILED DESCRIPTION OF THE INVENTION

Figure 1:
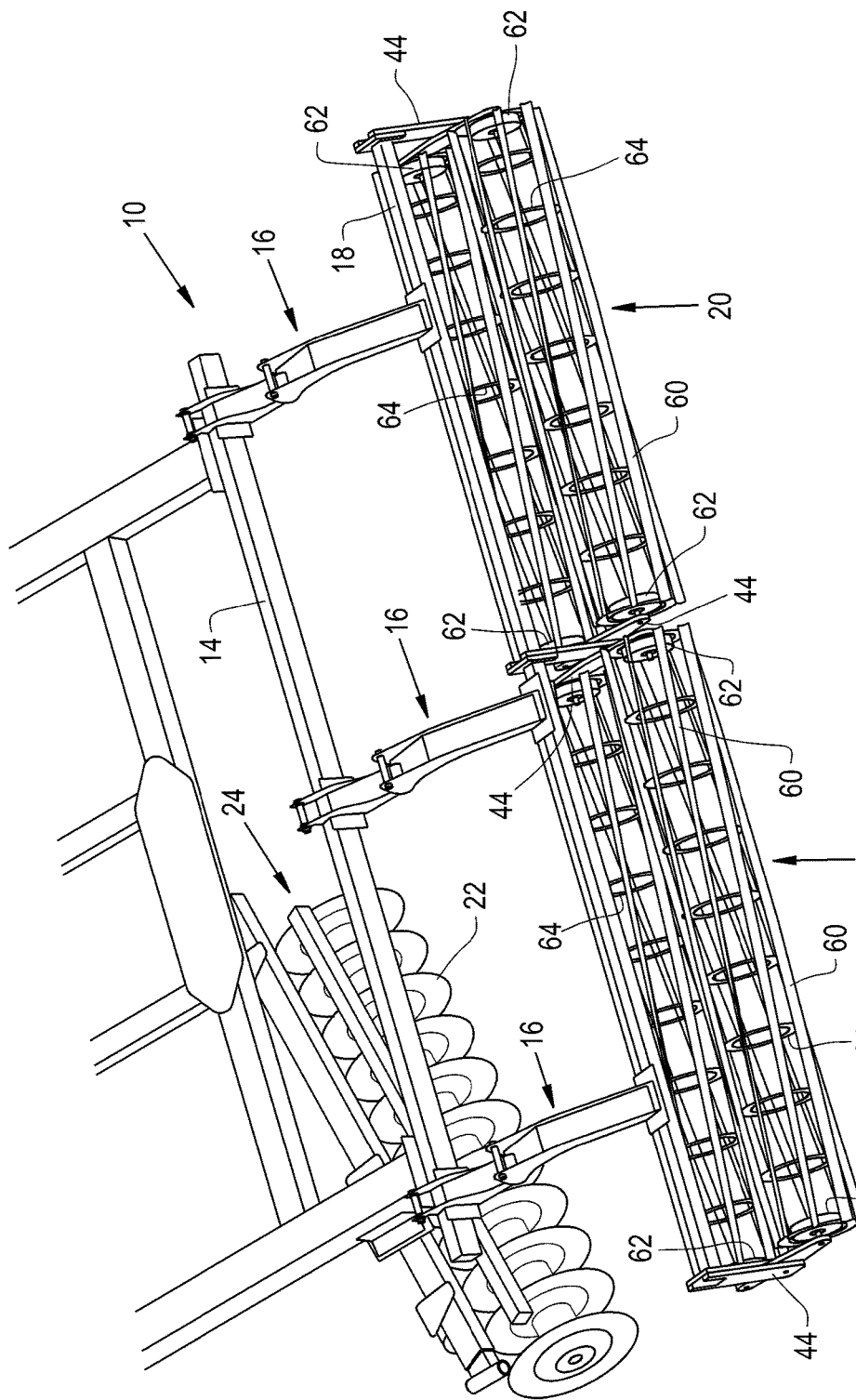
FIG. 1 is a perspective view of an agricultural tillage implement using an embodiment of a double rolling basket attachment as disclosed herein.
Figure 3:
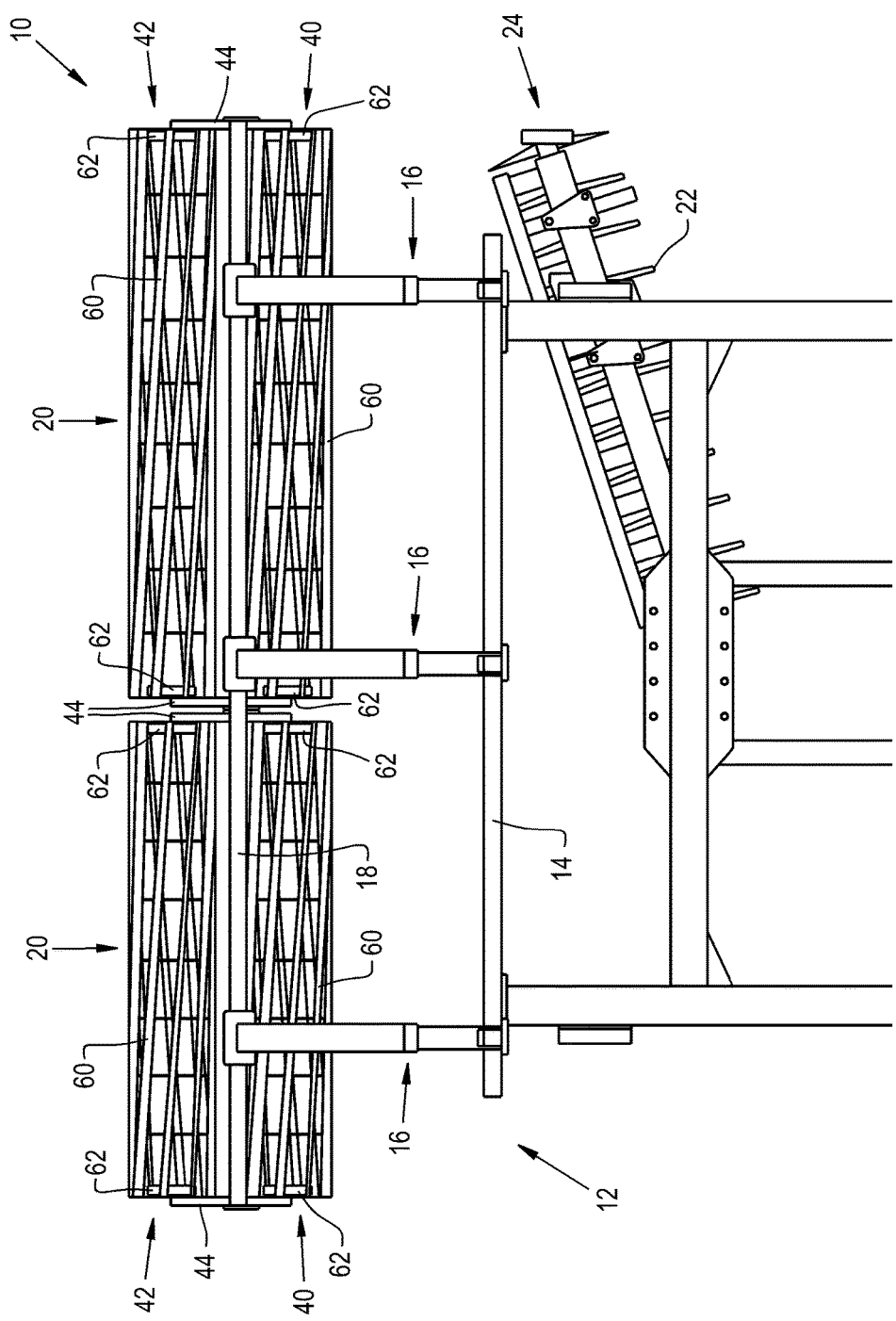
FIG. 3 is a top view of the agricultural tillage implement and double rolling basket attachment shown in FIGS. 1 and 2.

Referring now to the drawings more specifically and to FIGS. 1 and 3 in particular, there is shown an embodiment of a tillage implement 10. Tillage implement 10 includes a double rolling basket attachment 12 connected to a frame member 14 of implement 10. Frame member 14 is part of tillage implement 10 that is towed by a traction unit, such as by an agricultural tractor (not shown). Double rolling basket attachment 12 is connected to frame member 14 by a plurality of positioning arm assemblies 16, the positioning arm assemblies 16 extending from frame member 14 to a secondary frame member 18 that is part of double rolling basket attachment 12.

Double rolling basket attachment 12 includes one or more double rolling basket assembly 20 which collectively may be thought of as an auxiliary implement for finishing the soil. The auxiliary implement also may include a spring tooth drag (not shown) with the double rolling basket assemblies 12, which act to finish the soil. In the exemplary embodiment shown, two double rolling basket assemblies 20 are shown positioned in side-by-side relationship across the width of tillage implement 10. It should be understood that for wider implements, three or more double rolling basket assemblies 20 may be used. For a small, narrow implement, one double rolling basket assembly 20 can be used.

In the illustrated embodiment, implement 10 is a disc ripper 10, having a plurality of concave, rotating discs 22 held in a disc row 24. Only a single disc row 24 is shown in the drawings for simplicity and clarity in illustration; however, it should be understood that in common applications and uses a plurality of disc rows 24 may be provided side-by-side in line with one another or angularly to one another. Implement 10 also can include additional disc rows 24 in front of the single disc row 24 that is illustrated, either in line with one another or angularly disposed with respect to one another, often at the opposite angle to the first described disc row or rows 24. Disc rippers of the type described are well known to those skilled in the art and will not be described further herein. However, it should be understood also that a double rolling basket attachment 12 as described herein can be used together with implements other than a disc ripper, such as, for example and not limitation, a chisel plow or cultivator.

Figure 2:
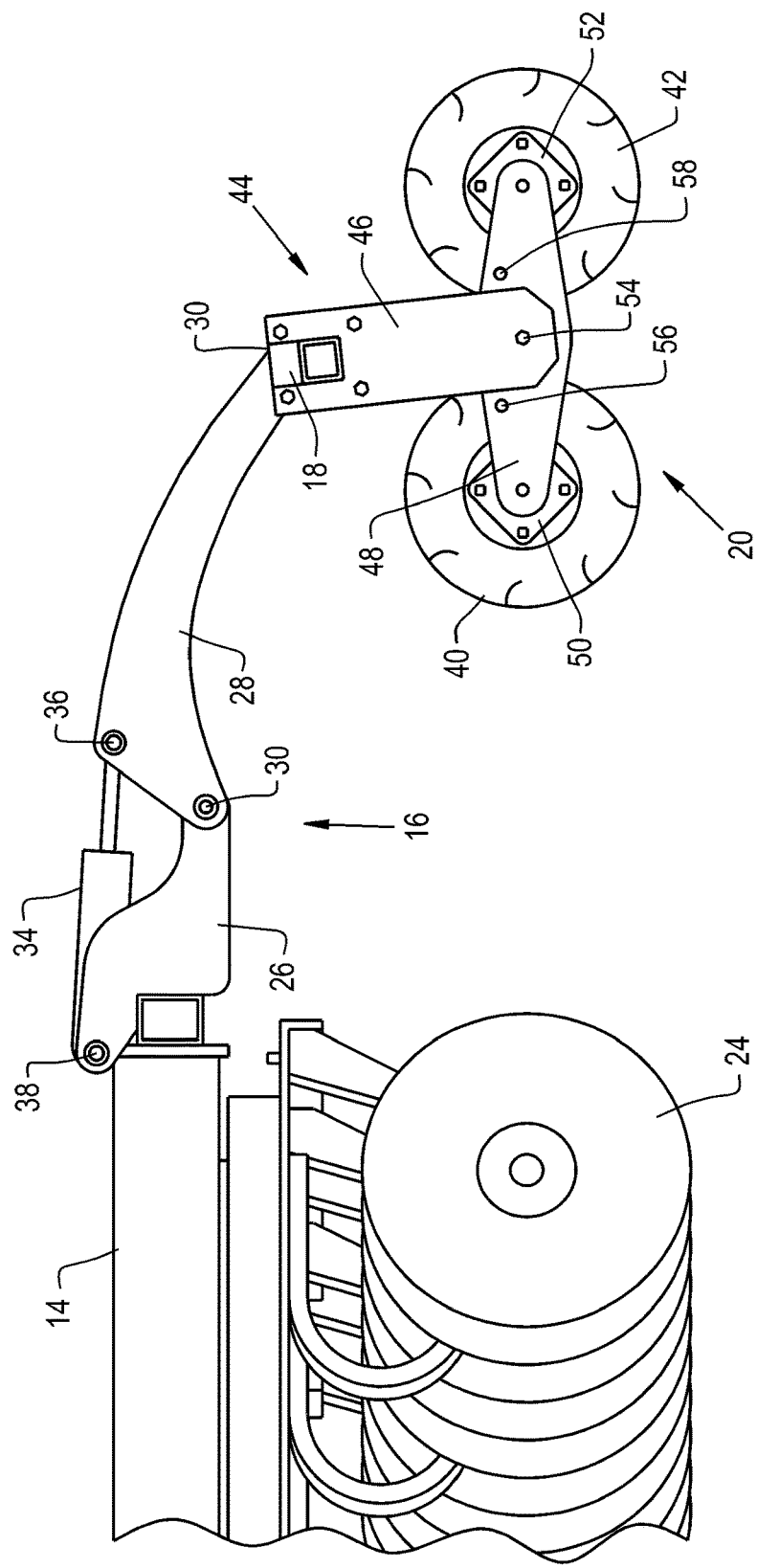
FIG. 2 is a side elevational view of the agricultural tillage implement and double rolling basket attachment shown in FIG. 1.

With reference now more particularly to FIG. 2, each positioning arm assembly 16 includes a bracket 26 connected in fixed position to frame member 14 of implement 10. A positioning arm 28 is pivotally connected to bracket 26 at lower confronting regions thereof forming a pivotal connection 30. In the exemplary embodiment shown, positioning arm 28 is curved downwardly. A distal end connection 32 connects the distal end of positioning arm 28 to secondary frame member 18. A force applicator 34, such as a hydraulic actuator, spring or the like is connected between an upper pivotal connection 36 formed with positioning arm 28 and a pivotal connection 38 to bracket 26. Accordingly, actuation of force applicator 34 causes positioning arm 28 to rotate about lower pivotal connection 30, thereby causing the distal end of positioning arm 28 at the distal end connection 32 to move upwardly or downwardly, and thereby moving secondary frame member 18 upwardly or downwardly as well.

Each double rolling basket assembly 20 includes a forward basket 40 and a rearward basket 42 disposed in a fore and aft relationship, substantially aligned with one another. End hanger assemblies 44 are provided at each end of each basket pair including a forward basket 40 and a rearward basket 42. Hanger assemblies 44 connect baskets 40, 42 to secondary frame member 18 and thereby to positioning arm assembly 16 for movement by force applicator 34.

Each hanger assembly 44 includes a substantially vertical leg 46, the upper end of which is connected in fixed position to secondary frame member 18. A horizontal beam 48 extends between bearings 50, 52 of baskets 40, 42 respectively. Accordingly, forward basket 40 is rotatably connected to a first or forward end of horizontal beam 48, and rearward basket 42 is rotatably connected to a second or rearward end of horizontal beam 48. A pivotal connection 54 is formed between the distal end of vertical leg 46 and horizontal beam 48, substantially at a center location of horizontal beam 48, between the forward and rearward ends thereof. Accordingly, beam 48 can tilt relative to vertical leg 46 independently of any vertical movement caused by actuation of force applicator 34, thereby causing forward basket 40 to elevate while rearward basket 42 lowers or forward basket 40 to lower as rearward basket 42 elevates.

First and second rotation restrictions or stops 56, 58 are provided in horizontal beam 48, on opposite sides of vertical leg 46. First and second rotation stops 56, 58 are pedestals, posts or protrusions that encounter vertical leg 46 at maximum rotation of horizontal beam 48. As a result, horizontal beam 48 cannot rotate beyond either rotation stop 56 or rotation stops 58. First and second rotation stops 56, 58 limit the degree of pivotal rotation of horizontal beam 48 about pivotal connection 54 so that baskets 42, 44 cannot become inverted. Other types of rotation stops also can be used to limit rotation of horizontal beam 48 in either direction.

Forward basket 40 and rearward basket 42 are similarly constructed, each including a plurality of bars 60 extending between end plates 62 at each end of bars 60. Intermediate positioning or spacer rings 64 are provided to support bars 60 between end plates 62. Bars 60 may have various shapes, and can be arranged in a straight, longitudinal fashion or in a spiral arrangement.

If placed in contact with the ground, baskets 40, 42 roll as tillage implement 10 is advanced across a field. As bars 60 encounter clods of dirt or other irregularities on the ground, bars 60 act to break up the clods and irregularities. If forward basket 40 encounters a rock or clod that does not yield readily, forward basket 40 can climb up and over the obstruction, with rearward basket 42 tilting downwardly and forward basket 40 tilting upwardly as horizontal beam 48 rotates about pivotal connection 54. As rearward basket 42 encounters the same or another obstruction, rearward basket 42 can also climb up and over the obstruction if the obstruction does not yield. Forward basket 40 will rotate downwardly as rearward basket 42 elevates when horizontal beam 48 pivots about pivotal connection 54. In the case of an obstruction that is a clod or clump of soil and/or plant residue, which may have been partially broken by forward basket 40, the action of rearward basket 42 will further destruct the clod or clump.

The present invention improves overall ground contact in addition to adjusting for obstacles encountered on the surface. As upward or downward incline are encountered, the assembly of forward basket 40 rearward basket 42 and horizontal beam 48 can follow the contour change more closely, with the horizontal beam rotating about pivotal connection 54.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
a frame member;
a secondary frame member;
a positioning arm assembly which connects the frame member to the secondary frame member;
a side hanger assembly coupled to the secondary frame, the side hanger assembly including a substantially vertical leg fixed to the secondary frame at one end thereof and a horizontal beam having first and second ends and a pivotal connection to the other end of the substantially vertical leg between the first and second ends;
a first rolling basket connected to the first end of the horizontal beam;
a second rolling basket connected to the second end of the horizontal beam; and
wherein the first and second rolling baskets are connected to the horizontal beam each about an axis of rotation and the pivotal connection is at least as close as adjacent to a line between the axis of rotation of the first and second rolling baskets;
wherein pivotal connections between the horizontal beam and (a) the first rolling basket, (b) the second rolling basket, and (c) the vertical leg are in a horizontal alignment; and
wherein first and second rotation stops are positioned on the horizontal beam such that one of each of the first and second rotation stops is positioned near each lateral edge of the vertical leg to limit the degree of rotation between the vertical leg and the horizontal beam.

2. The agricultural tillage implement of claim 1, wherein the positioning arm assembly further composes a bracket, a positioning arm, and a force applicator, wherein the bracket is pivotally connected at one end to a portion of the frame member and the bracket is pivotally connected at an opposite end to a lower pivot connection of one end of the positioning arm, wherein the force applicator is connected at one end thereof to at least a portion of the bracket and at an opposite end to an upper pivot connection of the one end of the positioning arm, wherein the positioning arm is connected at an opposite end thereof to the secondary frame member, and wherein the force applicator moves the positioning arm to pivot at least at the upper and lower pivot connections to move the secondary frame member upward and downward.

3. An agricultural tillage implement, comprising:
a frame member;
a secondary frame member;
a positioning arm assembly which connects the frame member to the secondary frame member;
a double rolling basket assembly coupled with the secondary frame member, the double rolling basket assembly including:
a first rolling basket;
a second rolling basket behind the first rolling basket;
first and second hanger assemblies at opposite ends of the first and second rolling basket, each of the first and second hanger assemblies having a substantially vertical leg fixed to the secondary frame member and a horizontal beam pivotally connected to the vertical leg thereof;
each horizontal beam of the first and second hangers having rotatable connections to the first basket and the second basket;
wherein the first and second rolling baskets are connected to the horizontal beam each about an axis of rotation and the pivotal connection is at least as close as adjacent to a line between the axis of rotation of the first and second rolling baskets;
wherein pivotal connections between the horizontal beam and (a) the first rolling basket, (b) the second rolling basket, and (c) the vertical leg are in a horizontal alignment; and
wherein first and second rotation stops are positioned on each horizontal beam such that one of each of the first and second rotation stops is positioned near each lateral edge of each vertical leg to limit the rotation of the horizontal beams relative to the substantially vertical legs.

4. The agricultural tillage implement of claim 3, further comprising a plurality of positioning arm assemblies, each positioning arm assembly of the plurality of positioning arm assemblies further comprising a bracket, a end to a portion of the frame member and the bracket is pivotally connected at an opposite end to a lower pivot connection of one end of the positioning arm, wherein the force applicator is connected at one end to at least a portion of the bracket and at an opposite end to an upper pivot connection of the one end of the positioning arm, wherein the positioning arm is connected at an opposite end thereof to the secondary frame member, and wherein the force applicator moves the positioning arm to pivot at least at the upper an lower pivot connections to move the secondary frame member upward and downward.

5. The agricultural tillage implement of claim 4, further comprising a second double rolling basket assembly coupled with the secondary frame member, the second double rolling basket assembly including:

a forward basket aligned with the first rolling basket;

a rearward basket behind the forward basket and aligned with the second rolling basket;

third and fourth hanger assemblies at opposite ends of the forward and rearward baskets, each of the third and fourth hanger assemblies having a substantially vertical leg fixed to the secondary frame member and a horizontal beam pivotally connected to the substantially vertical leg thereof;

each horizontal beam of the third and fourth hanger assemblies having rotatable connections to the forward basket and the rearward basket;

wherein said forward and rearward rolling baskets of the second double rolling basket assembly are connected to the horizontal beam each about an axis of rotation and the pivotal connection is at least as close as adjacent to a line between the axis of rotation of the first and second rolling baskets of the second double rolling basket assembly;

wherein pivotal connections between each horizontal beam and (a) the forward basket, (b) the rearward rolling basket, and (c) the vertical leg are in a horizontal alignment; and wherein first and second rotation stops are positioned on each horizontal beam such that one of each of the first and second rotation stops is positioned near each lateral edge of each vertical leg to limit the degree of rotation between the vertical leg and the horizontal beam.

\* \* \* \* \*